Dec. 24, 1946.  R. S. PYNE  2,413,068
DIAPHRAGM CHUCK
Filed Feb. 14, 1945
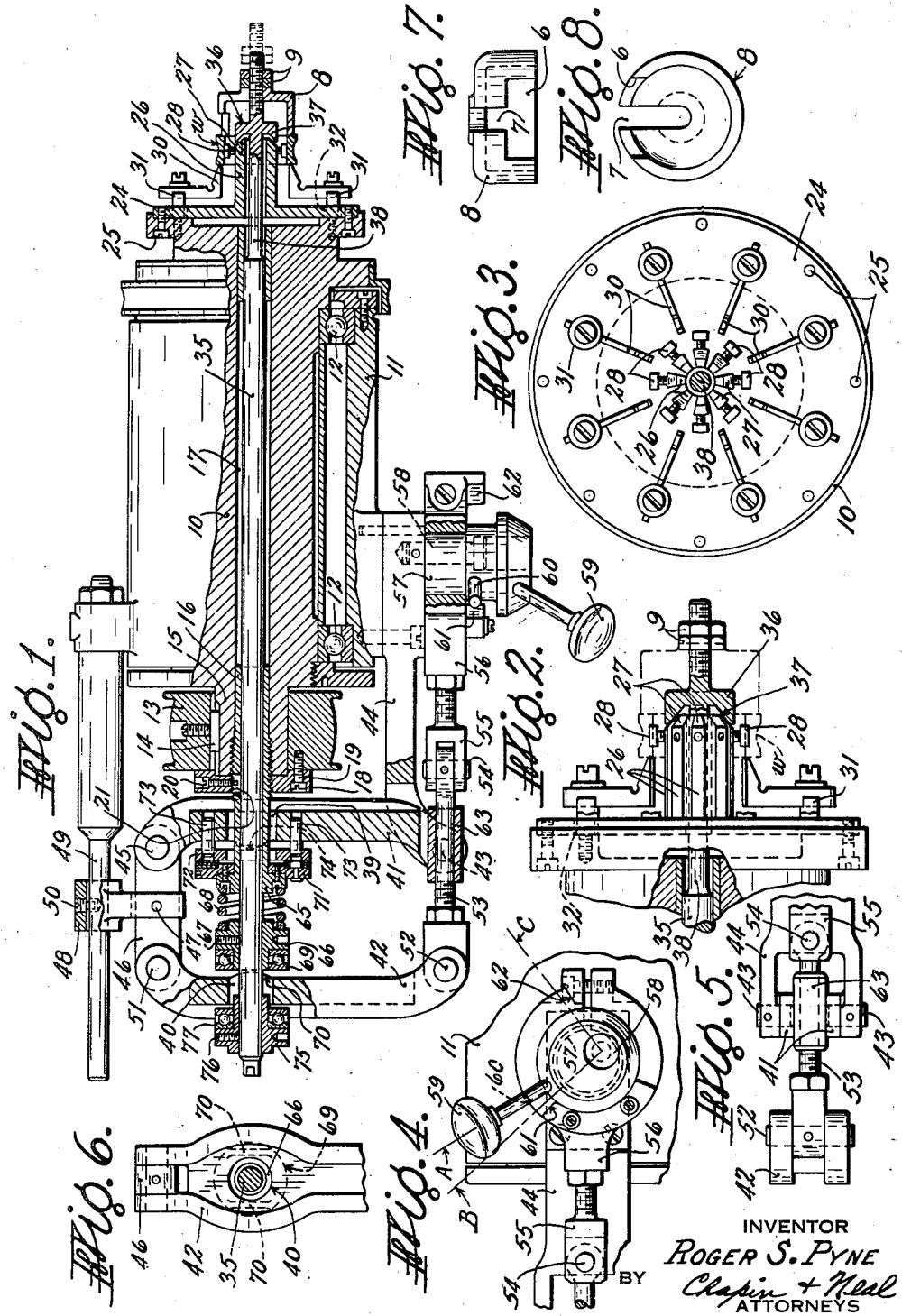
INVENTOR
ROGER S. PYNE
BY Chapin + Neal
ATTORNEYS Patented Dec. 24, 1946

2,413,068

UNITED STATES PATENT OFFICE 2,413,068

DIAPHRAGM CHUCK

Roger S. Pyne, Longmeadow, Mass., assignor to Van Norman Company, Springfield, Mass., a corporation of Massachusetts Application February 14, 1945, Serial No. 577,881

2 Claims. (Cl. 279—2)

This invention relates to an improved work supporting spindle and chuck combination. More particularly it relates to such combination for supporting workpieces which are to be ground or otherwise treated on their outer surfaces.

The principal object of the invention is to provide a more secure gripping of the workpiece, and in a manner to secure greater accuracy in the grinding operation. More specific objective will be made apparent after the disclosure of the invention in the following specification.

In the accompanying drawing, which illustratively discloses the invention embodied in a chuck for holding the inner race of a ball bearing during grinding;

Fig. 1 is a plan view of the spindle and chuck with parts broken away into axial section;

Fig. 2 is a fragmentary plan view, on a larger scale, of the chuck, parts being shown in section;

Fig. 3 is an end view looking from the right of Fig. 2;

Fig. 4 is an elevational view of the chuck operating eccentric and its operating handle;

Fig. 5 is a similar view of the guiding mechanism for the connecting rod through which the eccentric operates;

Fig. 6 is a fragmentary elevational view of the outer rocker arm; and

Figs. 7 and 8 are respectively plan and elevational views of the removable work engaging collar.

Referring to the drawing the work spindle is shown at 10 rotatably mounted in a housing 11 on ball bearings 12. The spindle is adapted to be driven by a pulley 13 keyed at 14 to a reduced portion 15 of the spindle. A bushing or sleeve 16 is threaded into the bore 17 of the spindle and a lock collar 18 is threaded on sleeve 16 and secured by machine screws 19 to pulley 13. A set screw 20 engaging in a recess 21 in the sleeve locks the pulley to the spindle and sleeve.

A circular plate 24 is secured to the end of the spindle by machine screws 25. Extending outwardly from plate 24 and integral therewith are a plurality of radially spaced fingers 26. The free ends of fingers 26 are beveled, on their outer surfaces, as shown at 27, and each is provided adjacent its ends with a headed screw 28, upon which, as later described, the ball race to be ground is mounted. A plurality of radially positioned work engaging members 30 are adjustably mounted in studs 31, which extend through openings 32 in plate 24 and are tapped into the end of spindle 10.

A rod 35 extends through bore 17 of the spindle and through and beyond the fingers 26. Outwardly of the end of fingers 26 the rod 35 is formed with a flange 36, the side of the flange adjacent the end of the fingers being recessed to provide an annular beveled surface 37 complementary to the beveled surfaces 27 on the ends of the fingers. The end of the rod 35 where it passes through the plate 24 and fingers 26 is reduced in diameter as shown at 38 to provide proper space for the distortion of the fingers. Outwardly of flange 36 the rod is threaded to receive adjustable lock nuts 9. When a workpiece, such as ball race W, is mounted in the chuck, as shown in Fig. 1 a cup shaped member 8 is adapted to be inserted between the abutment formed by nuts 9 and the workpiece. Member 8 is slotted at 7 to receive the rod 38 and this slot is widened at 6 to permit member 8 to pass over flange 36.

The rear end of rod 35 extends outwardly beyond pulley 13 and through aligned openings 39 and 40 formed respectively in forked rocker arms 41 and 42. One end of arm 41 is pivoted at 43 to a bracket 44 secured to one side of housing 11, the other end being pivoted at 45 to the inner end of a link 46 pivoted at 47 to a hub 48 mounted on a rod 49 secured to the opposite side of the housing. Hub 48 is held on the rod 49 by a set screw 50 in a manner to permit a slight rocking of the hub on the rod. One end of arm 42 is pivoted at 51 to the outer end of link 46. The other end of arm 42 is pivoted at 52 to a connecting rod 53 which in turn is pivotally connected at 54 to a fork 55 adjustably threaded in a collar 56 surrounding an eccentric 57 pivoted at 58 to bracket 44. Eccentric 57 is provided with an operating handle 59. A pin 60 carried by the eccentric 57 is adapted to engage stops 61 and 62 formed on collar 56 to limit the movement of the eccentric within the collar. The connecting rod 53 is provided with a sliding sleeve 63 slidably engaging, as best shown in Fig. 5, between the forked ends of rocker 41 to give labial support to the rod.

Sleeve 16 extends rearwardly through opening 39 in arm 41 and is formed on its outer end with a collar 65. A collar 66 is threaded on rod 35 and held in adjustable position by a set screw 67. A spring 68 positioned between collars 65 and 66 tends to retract rod 35. The outer side of collar 66 is provided with a thrust bearing 69 engageable with bosses 70, formed at the sides of opening 40. Secured to the inner face of collar 65 is one member 71 of a friction brake, the opposing member 72 being mounted on pins 73 carried by arm 41. Member 72 is engageable by bosses 74 formed at the sides of opening 39.

Rearwardly of rocker arm 42, a collar 75 is threaded on rod 35 and held in adjusted position by a set screw 76. Collar 75 supports a thrust bearing 77 engageable by rocker arm 42 when the latter is swung rearwardly about its pivot.

The operation of the chuck is as follows. The work supporting screws 28 are set roughly and then collectively ground to a collective diameter which is slightly greater than the inside diameter of the ball race to be ground. The members 30 are also set so that their ends approximately define the desired axial position of the ball race on the surface of the screws 28 and so that they will engage the adjacent end surface of the ball race. The work engaging ends of members 30 are then ground with required accuracy to the common plane desired.

With the parts positioned as shown in Fig. 2, the handle 59 is moved from its normal position A toward position B in Fig. 4. The resulting movement of the eccentric pushes rod 53 rearwardly swinging rocker arm 42 into engagement with thrust bearing 77 on the end of rod 35. Continued movement of handle 59 to the position B defined by stop 61 draws rod 35 rearwardly and beveled surfaces 37 of flange 36 engaging the complementary bevels 27 on the fingers 26 draw the latter toward each other so reducing the collective diameter of the work engaging surfaces of the screws 28 that the ball race W may be telescoped over them and positioned firmly against members 30. Upon return of handle 59 to position A surfaces 37 of flange 36 free the ends of the diaphragm fingers 26 permitting the screw heads 28 to engage the inside of the ball race under pressure from the stressed fingers.

Handle 59 is now moved in the direction of position C causing rod 53 to be drawn forwardly swinging rocker arm 42 to bring bosses 70 into contact with thrust bearing 69. Following the initial contact of arm 42 with bearing 69, arm 42 acts as a lever with its fulcrum at the bosses 70 causing the upper pivot 51 to move rearwardly and by taking up the slight pivotal motion allowed hub 48 on rod 49, as previously described, draws brake member 72 into contact with member 71. Further movement of handle 59 to position B moves rod 35 forwardly, against the action of spring 68, to the position shown in dotted lines at the right of Fig. 1 where ample space is afforded to insert cup member 8 between locked nuts 9 and the outer end face of the ball race W. During the insertion of the cup member the spindle is held against rotation by brake 71—72.

Upon release of handle 59 spring 68 acts to draw rod 35 rearwardly thus clamping the ball race W between the members 30 and cup member 8. Release of handle 59 releases the pull on rocker arm 42 thus releasing brake 71—72. After completion of the grinding operation the finished workpiece is released by moving handle 59 to position C, removing cup member 8 and then moving the handle to position B to again contract fingers 26 to permit removal of the piece from screws 28.

By the arrangement above described a substantial, or if desired the major, portion of the force which resists turning of the race W in the chuck during the grinding operation is applied to the end faces of the race. By distributing the clamping force between the end faces and the inner face of the race, distortion of the latter by the clamping means during the grinding operation is effectively eliminated, and a true and precise shaping of the race-way is obtained.

I claim:

1. A chuck comprising a plurality of stiffly flexible fingers arranged in a circular series, means engaging the ends of said fingers to simultaneously flex the fingers toward each other to permit an annular workpiece to be telescoped thereover, adjustable members engaging an end face of the annular workpiece and defining the position of the workpiece axially of the fingers, said fingers when released by said flexing means making a stressed engagement with the inner annular face of the workpiece, a pressure member spring pressed axially of the fingers toward said end engaging members, and a collar insertable between said pressure member and the opposite face of the workpiece to exert an endwise gripping force on the workpiece.

2. A spindle and chuck combination comprising a spindle housing, a spindle, having an axial bore therethrough, rotatably mounted in the housing, a plurality of stiffly flexible fingers mounted on the work supporting end of the spindle and arranged in a circular series concentric with the bore of the spindle, the outer surface of the free ends of the fingers being beveled toward their ends, a plurality of members mounted on the work supporting end of the spindle and arranged in a circular series radially outwardly of the fingers and in concentric relation therewith, a rod slidably mounted in the bore of the spindle and extending beyond each end thereof, a flange formed on said rod outwardly of the ends of the fingers, the face of said flange adjacent the fingers being beveled for radially inward wedging engagement with the beveled ends of the fingers, an adjustable abutment secured on the rod outwardly of said flange, a rocker arm pivoted to the spindle housing rearwardly of the spindle and having an opening through which said rod passes, thrust bearings secured to the rod on opposite sides of the rocker arm, operating means to swing the rocker arm rearwardly against the outer thrust bearing to move the rod rearwardly and draw said beveled flange into wedging engagement with said fingers and move the latter radially toward each other to permit an annular workpiece to be telescoped thereover into engagement with said members, said operating means being reversible to engage the inner thrust bearing and move the rod forwardly releasing the fingers into a stressed engagement with the inner annular face of the workpiece, a clamping member insertable between said abutment and the adjacent end face of the workpiece, and a spring positioned between said inner thrust bearing and the spindle to move said clamping member into engagement with the adjacent end face of the workpiece and exert an endwise gripping force on the workpiece when said operating means is released.

ROGER S. PYNE.